(12) United States Patent
Murai

(10) Patent No.: US 11,499,649 B2
(45) Date of Patent: Nov. 15, 2022

(54) FLOW CONTROL VALVE

(71) Applicant: AISAN KOGYO KABUSHIKI KAISHA, Obu (JP)

(72) Inventor: Shinji Murai, Obu (JP)

(73) Assignee: Aisan Kogyo Kabushiki Kaisha, Obu (JP)

( * ) Notice: Subject to any disclaimer, the term of this patent is extended or adjusted under 35 U.S.C. 154(b) by 0 days.

(21) Appl. No.: 17/191,148

(22) Filed: Mar. 3, 2021

(65) Prior Publication Data

US 2021/0278010 A1   Sep. 9, 2021

(30) Foreign Application Priority Data

Mar. 4, 2020   (JP) .............................. JP2020-036630

(51) Int. Cl.
*F16K 31/50*   (2006.01)
*F16K 1/08*    (2006.01)

(52) U.S. Cl.
CPC .............. *F16K 31/508* (2013.01); *F16K 1/08* (2013.01)

(58) Field of Classification Search
CPC ........ F16K 31/508; F16K 31/047; F16K 1/08; F16K 1/48; F02M 25/0836
See application file for complete search history.

(56) References Cited

U.S. PATENT DOCUMENTS

| | | | | |
|---|---|---|---|---|
| 2,596,419 A * | 5/1952 | Lowe | ........................ | F16K 1/50 251/272 |
| 5,390,703 A * | 2/1995 | Tengesdal | ................. | F16K 1/54 137/629 |
| 6,843,271 B2 * | 1/2005 | Weldon | .................... | F16K 24/04 123/516 |
| 9,803,593 B2 | 10/2017 | Kimoto et al. | | |
| 2004/0211373 A1 * | 10/2004 | Norris | ..................... | F16K 31/04 123/41.1 |
| 2005/0045839 A1 * | 3/2005 | Kajitani | ................ | F16K 31/047 251/14 |
| 2006/0185735 A1 * | 8/2006 | Tsuge | ................. | F02M 25/0836 137/495 |
| 2007/0176136 A1 * | 8/2007 | Speer | .................. | F16K 31/0655 251/321 |
| 2011/0001077 A1 * | 1/2011 | Masen | .................. | F16K 31/047 251/321 |

(Continued)

FOREIGN PATENT DOCUMENTS

| JP | 2016121790 A | 7/2016 |
|---|---|---|
| JP | 5996799 B2 | 9/2016 |
| JP | 2019152180 A | 9/2019 |

*Primary Examiner* — Patrick C Williams

(74) *Attorney, Agent, or Firm* — Conley Rose, P.C.

(57) ABSTRACT

A flow control valve includes a housing having a valve chamber, an inlet port, an outlet port, and a valve seat. In addition, the flow control valve includes a valve body disposed in the valve chamber, an actuator having an output rotational shaft, a feed screw mechanism to convert forward and reverse rotational motion of the output rotational shaft to axial reciprocating motion of the valve body, a backlash preventive spring positioned between the housing and the valve body, and a spring supporting device formed on the housing and having a spring seating surface. The spring seating surface is spaced from the valve seat in an opening direction of the valve body.

10 Claims, 4 Drawing Sheets

(56) References Cited

U.S. PATENT DOCUMENTS

2011/0115319 A1* 5/2011 Schade ................ F16K 31/047
                                                             310/83
2015/0102039 A1* 4/2015 Balsdon ............ F16K 31/52408
                                                             220/562
2019/0277417 A1   9/2019 Onodera

* cited by examiner

FLOW CONTROL VALVE

CROSS-REFERENCE TO RELATED APPLICATIONS

This application claims benefit of Japanese Patent Application Serial No. 2020-036630 filed Mar. 4, 2020, which is hereby incorporated herein by reference in its entirety for all purposes.

BACKGROUND

The present disclosure relates generally to a flow control valve.

Conventionally, a vehicle with an internal-combustion engine is provided with an evaporated fuel processing device. The evaporated fuel processing device includes a canister configured to adsorb and desorb evaporated fuel generated in a fuel tank of the vehicle. Further, the evaporated fuel processing device includes a flow control valve that is installed in a vapor passage connecting the fuel tank and the canister. The flow control valve may function to close the vapor passage when the vehicle is parked and to open the vapor passage when the vehicle is refueled. Such a flow control valve is taught by JP2019-152180A. The flow control valve taught by JP2019-152180A includes a valve housing, a valve body disposed in a valve chamber formed in the valve housing, a feed screw mechanism, and a backlash preventive spring. The valve body is configured to move or reciprocate axially in the valve chamber so as to close and open a valve seat. The feed screw mechanism converts the forward and reverse rotational motion of an output rotational shaft of an actuator to the axial reciprocating motion of the valve body. The backlash preventive spring biases the valve body in such a direction that backlash of the feed screw mechanism can be prevented. The backlash preventive spring is generally a coil spring. The valve housing has a spring contact surface formed thereon and is configured to receive a coil end of the backlash preventive spring. Further, the spring contact surface is formed so as to be flush with the valve seat on which the valve body is seated in an axial direction of the valve chamber.

SUMMARY

According to one aspect of the present disclosure, a flow control valve may include a housing having a valve chamber, an inlet port, an outlet port, and a valve seat. In addition, the flow control valve includes a valve body disposed in the valve chamber and configured to move axially so as to close and open the valve seat, an actuator having an output rotational shaft, a feed screw mechanism configured to convert a forward and a reverse rotational motion of the output rotational shaft to axial reciprocating motion of the valve body, a backlash preventive spring comprising a coil spring positioned between the housing and the valve body and configured to bias the valve body in such a direction that backlash of the feed screw mechanism is prevented, and a spring supporting device on the housing. The spring support device has a spring seating surface configured to contact and receive a coil end of the backlash preventive spring. The spring seating surface is spaced from the valve seat in an opening direction of the valve body in an axial direction of the valve chamber.

According to one aspect of the disclosure, when the valve body is opened, the coil end of the backlash preventive spring is held in a position spaced from the valve seat so as to form a space between the coil end of the backlash preventive spring and the valve seat. Therefore, obstruction of a flow of fluid by the coil end of the backlash preventive spring and a spring portion adjacent to the coil end is reduced and/or avoided. This may lead to decrease of a fluid-flow resistance. Further, the backlash preventive spring can be prevented from being circumferentially displaced. As a result, an area of a flow passage can be prevented from being changed such that the fluid-flow resistance can be prevented from being changed.

Other objects, features, and advantages, of the present disclosure will be readily understood after reading the following detailed description together with the accompanying drawings and the claims.

DETAILED DESCRIPTION

As previously described, according to the flow control valve taught by JP2019-152180A, the spring contact surface is formed so as to be flush with the valve seat on which the valve body is seated in an axial direction of the valve chamber. Therefore, when the flow control valve is opened, a flow of fluid is obstructed by the coil end of the backlash preventive spring contacting the spring contact surface and a portion adjacent to the coil end. This may lead to an increase in the fluid-flow resistance of the flow control valve. Further, if the backlash preventive spring is circumferentially displaced, an area of a flow passage of the flow control valve is changed, so that the fluid-flow resistance of the flow control valve may be changed. Thus, there is a need in the art for an improved flow control valve.

In the following, a detailed representative embodiment of the present disclosure will be described with reference to FIGS. 1 to 5. This embodiment is directed to a flow control valve (closing valve) 30 used in an evaporated fuel processing device 10 of a fuel system of a vehicle (automobile) with an internal-combustion engine 24.

Figure 1:
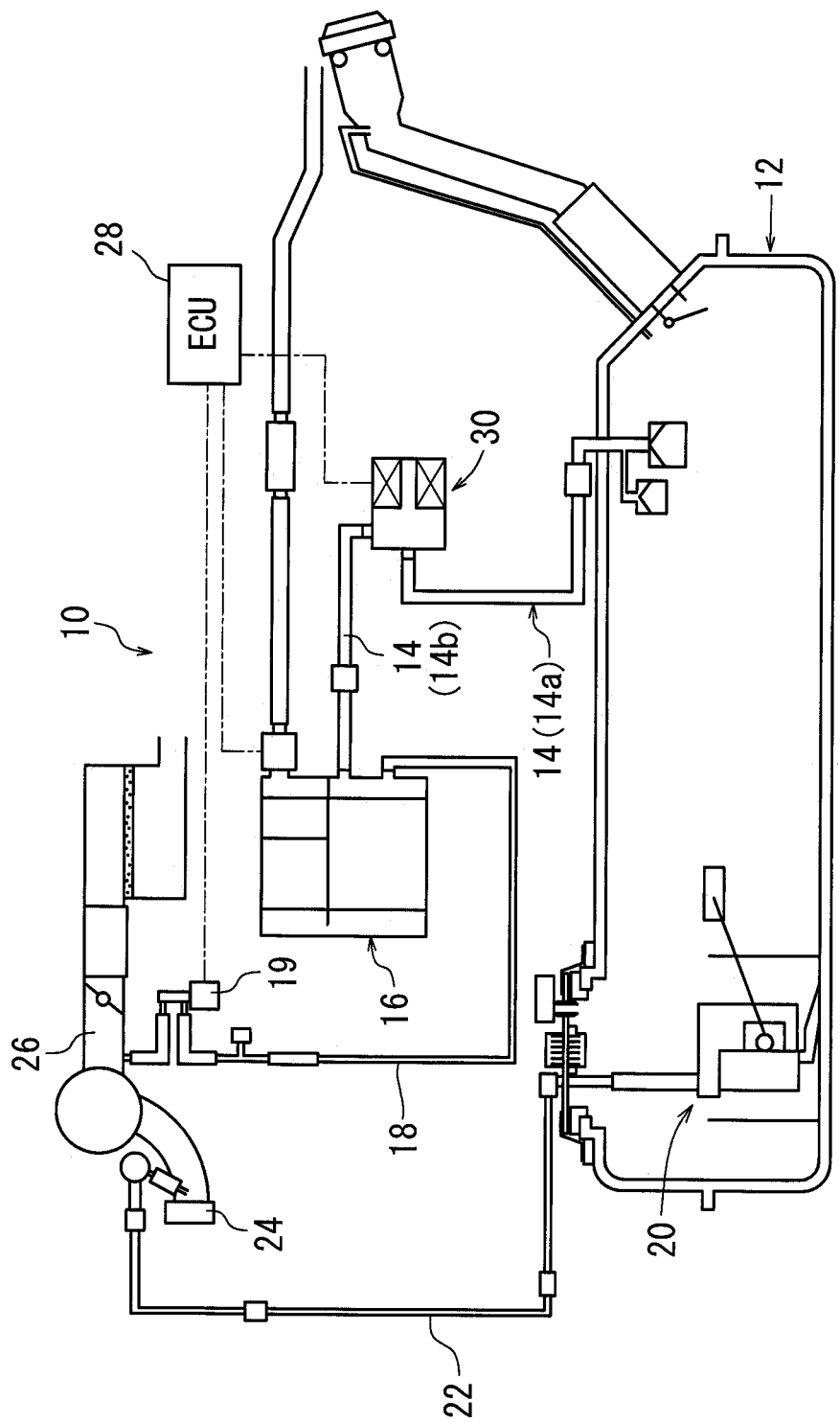
FIG. 1 is a schematic view of an evaporated fuel processing device having a flow control valve according to a representative embodiment of the present disclosure.

As shown in FIG. 1, the evaporated fuel processing device 10 of the fuel system includes a canister 16 configured to adsorb fuel vapor (which will be hereinafter referred to as "evaporated fuel") generated in a fuel tank 12. The canister 16 is fluidly coupled to the fuel tank 12 via a vapor conduit 14. The flow control valve 30 is disposed along the vapor conduit 14. Further, the canister 16 is fluidly coupled to an intake passage 26 of the internal-combustion engine 24 via a purge conduit 18. A purge valve 19 is disposed along the purge conduit 18. The flow control valve 30 and the purge valve 19 are coupled to an engine control unit (ECU) 28. Further, the internal-combustion engine 24 of the vehicle is fluidly coupled to a fuel tank 12 via a fuel-feeding pipe 22.

In the fuel system, fuel in the fuel tank 12 is fed into the internal-combustion engine 24 via the fuel-feeding pipe 22 by a fuel-feeding device 20 disposed in the fuel tank 12.

Conversely, in the evaporated fuel processing device 10, the evaporated fuel generated in the fuel tank 12 is transferred to the canister 16 through the vapor conduit 14 so as to be adsorbed by an adsorbent, e.g., activated carbon (not shown), within the canister 16. When the purge valve 19 is opened at an appropriate time while the internal-combustion engine 24 is driven, the evaporated fuel in the canister 16 is fed into the internal-combustion engine 24 via the purge conduit 18 by the aid of a negative pressure caused by an intake pressure of the internal-combustion engine 24.

Further, when the vehicle is parked, the flow control valve 30 is held in a closed condition so that the vapor conduit 14 is closed. Therefore, the evaporated fuel in the fuel tank 12 is prevented from flowing into the canister 16. Conversely, when the vehicle is refueled, the flow control valve 30 is opened so that the vapor conduit 14 is opened. Therefore, the evaporated fuel in the fuel tank 12 is fed into the canister 16 via the vapor conduit 14 so as to be adsorbed by the adsorbent within the canister 16.

Figure 2:
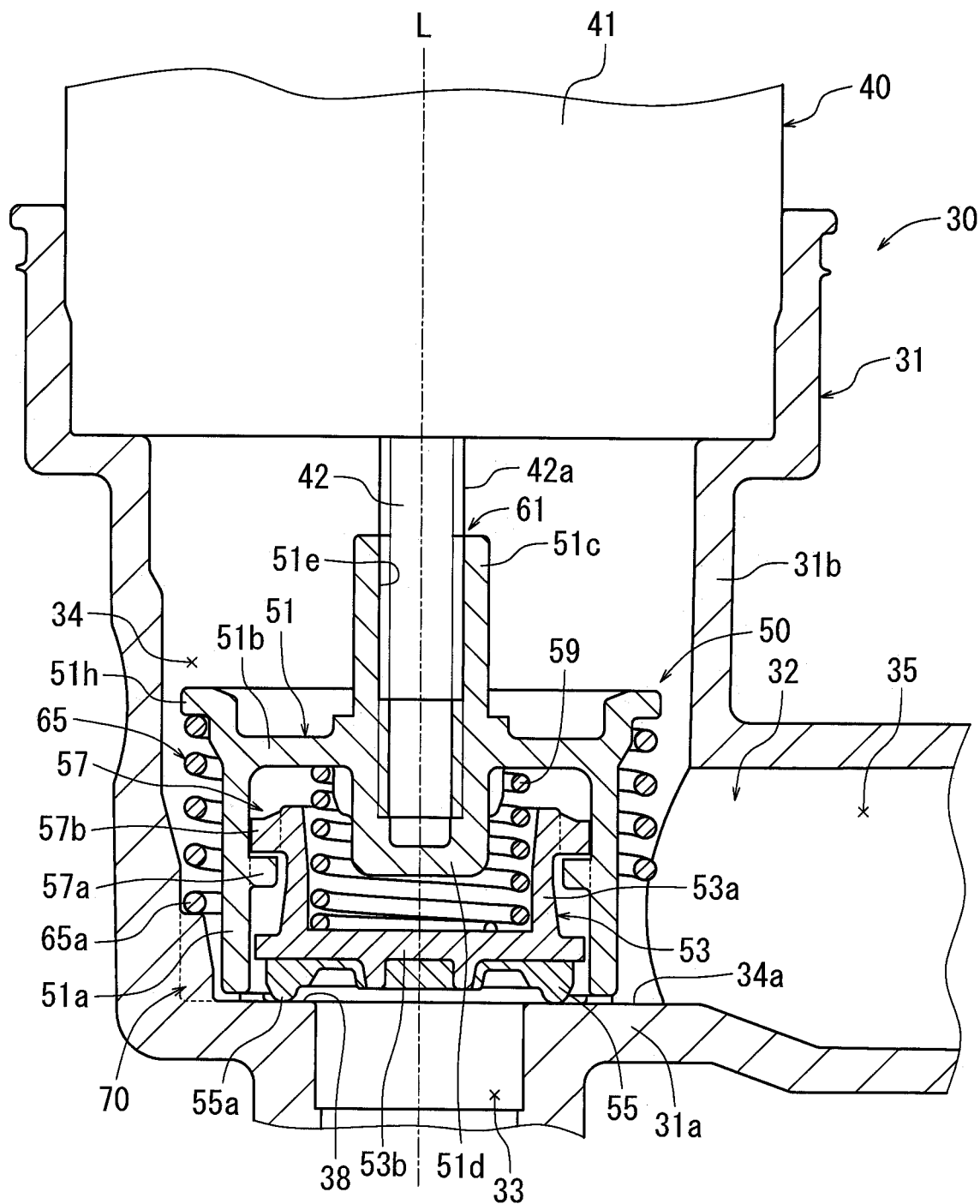
FIG. 2 is a cross-sectional side view of the flow control valve of FIG. 1 illustrating a valve-closed condition.

As shown in FIG. 2, the flow control valve 30 includes a housing 31, a stepping motor 40, and a valve body 50. The housing 31 includes a lower cylindrical valve chamber 34 formed therein and having a vertically oriented central axis line (central axis) L. The housing 31 has a vertically oriented hollow cylindrical inlet port 33 concentrically formed in a central portion of a bottom wall 31a thereof and in selective fluid communication with the valve chamber 34. The housing 31 also includes a lateral (rightward) hollow cylindrical outlet port 35 in a lower portion of a circumferential wall 31b thereof and in fluid communication with the valve chamber 34. Thus, the inlet port 33, the lower portion of the housing 31, and the outlet port 35 defines an inverted L-shaped fluid-flow channel 32. The inlet port 33 is connected to a fuel tank-side portion 14a of the vapor conduit 14 (FIG. 1), while the outlet port 35 is connected to a canister-side portion 14b of the vapor conduit 14 (FIG. 1).

As shown in FIG. 2, the housing 31 has a valve seat 38 formed on an upper (inner) surface 34a of the bottom wall 31a of the housing 31 (i.e., a bottom surface of the valve chamber 34). The valve seat 38 surrounds an upper opening of the inlet port 38. The valve seat 38 is flush with the upper surface 34a of the housing bottom wall 31a. That is, the valve seat 38 is formed as a portion of the bottom surface 34a of the valve chamber 34. Further, the upper surface 34a of the housing bottom wall 31a and the valve seat 38 formed thereon are formed as a flat surface oriented perpendicular to the axis line L of the valve chamber 34. The valve seat 38 is laterally continuous with a lower surface portion of the outlet port 35.

As shown in FIG. 2, the stepping motor 40 has a motor main body 41 positioned on an upper portion of the housing 31. The stepping motor 40 has a rotatably output shaft 42 extending downward from the motor main body 41 and configured to rotate in forward and reverse rotational directions. The output rotational shaft 42 is concentrically positioned in the valve chamber 34 of the housing 31. The output rotational shaft 42 has a male threaded portion 42a formed on an outer circumferential surface thereof. The stepping motor 40 may also be referred to herein as an "actuator."

As shown in FIG. 2, the valve body 50 includes a (bottomless cylindrical) valve retainer member 51, a (bottomed cylindrical) valve member 53, and a valve spring 59. The valve retainer member 51 includes a cylindrical wall portion 51a having a vertically oriented axis line (central axis), an upper wall portion 51b closing an upper portion of the cylindrical wall portion 51a, and a bottomed cylindrical shaft portion 51c formed on a central portion of the upper wall portion 51b. The cylindrical wall portion 51a, the upper wall portion 51b, and the shaft portion 51c are concentrically arranged. Further, the shaft portion 51c is configured such that a bottom portion 51d thereof is positioned below the upper wall portion 51b. The shaft portion 51c has a female threaded portion 51e formed on an inner circumferential surface thereof and configured to threadably engage the male thread portion 42a of the output rotational shaft 42. Further, the cylindrical wall portion 51a has an annular flange portion 51h formed on an upper peripheral edge thereof and projected radially outward.

As shown in FIG. 2, the valve member 53 includes a cylindrical portion 53a having a vertically oriented axis line (central axis), a lower wall portion 53b closing a lower portion of the cylindrical portion 53a and having an outer diameter greater than an outer diameter of the cylindrical portion 53a. The cylindrical portion 53a and the lower wall portion 53b are concentrically arranged. Further, the lower wall portion 53b is provided with a circular plate-shaped sealing member 55 made of a rubber-like elastic member and attached to a lower surface thereof. The sealing member 55 has an annular sealing portion 55a formed on a circumferential portion of a lower surface thereof and projected downward. The sealing portion 55a has a substantially V-shaped cross section. Further, the valve member 53 is concentrically disposed in the cylindrical wall portion 51a of the valve retainer member 51. The valve member 53 is configured to move vertically while being prevented from rotating about the axis line of the cylindrical wall portion 51a.

As shown in FIG. 2, the valve body 50 further includes a plurality of (four in this embodiment) stopper devices 57 that limit vertical motion of the valve member 53 relative to the valve retainer member 51 such that the valve member 53 can vertically move relative to the valve retainer member 51 only in a predetermined range. The stopper devices 57 are composed of stopper projections 57a that are circumferentially spaced at intervals along an inner circumferential surface of the cylindrical wall portion 51a of the valve retainer member 51, and engagement projections 57b are circumferentially spaced at intervals along an outer circumferential surface of the cylindrical portion 53a of the valve member 53. The engagement projections 57b are positioned above the stopper projections 57a, so as to be vertically aligned with each other.

As shown in FIG. 2, the valve spring 59 is a coil spring. The valve spring 59 is concentrically positioned in the cylindrical portion 53a of the valve member 53. Further, the valve spring 59 is sandwiched between the lower wall portion 53b of the valve member 53 and the upper wall portion 51b of the valve retainer member 51 while being vertically compressed therebetween. That is, the valve spring 59 is configured to vertically bias the valve member 53 and the valve retainer member 51 axially apart. Further, a biasing force of the valve spring 59 is received due to engagement of the stopper projections 57a of the valve retainer member 51 and the engagement projections 57b of the valve member 53. That is, vertical motion of the valve member 53 relative to the valve retainer member 51 is limited by the stopper device 57.

As shown in FIG. 2, the valve body 50 is disposed in the valve chamber 34 of the housing 31 and is configured to move or reciprocate vertically (axially) so as to close and open the valve seat 38. That is, the valve retainer member 51 is concentrically disposed in the valve chamber 34 of the housing 31 so as to move vertically while being prevented from rotating about the axis line of the cylindrical wall portion 51a. Further, the sealing portion 55a of the sealing member 55 attached to the valve member 53 is configured to move into and out of contact with the valve seat 38 formed on the housing 31, thereby closing and opening, respectively, the valve seat 38.

As shown in FIG. 2, the shaft portion 51c of the valve retainer member 51 is vertically movably coupled to the output rotational shaft 42 of the stepping motor 40 by threaded engagement of the female thread portion 51e of the shaft portion 51c and the male thread portion 42a of the output rotational shaft 42. Therefore, when the stepping motor 40 is activated so as to rotate the output rotational shaft 42 in forward and reverse rotational directions, the valve body 50 moves or reciprocates vertically (axially) so that the sealing member 55 attached to the valve member 53 is seated against and spaced from the valve seat 38, respectively. Thus, the female thread portion 51e of the shaft portion 51c and the male thread portion 42a of the output rotational shaft 42 constitute a feed screw mechanism 61 that functions to convert forward and reverse rotational motion of the output rotational shaft 42 to axial reciprocating motion of the valve body 50.

Figure 3:
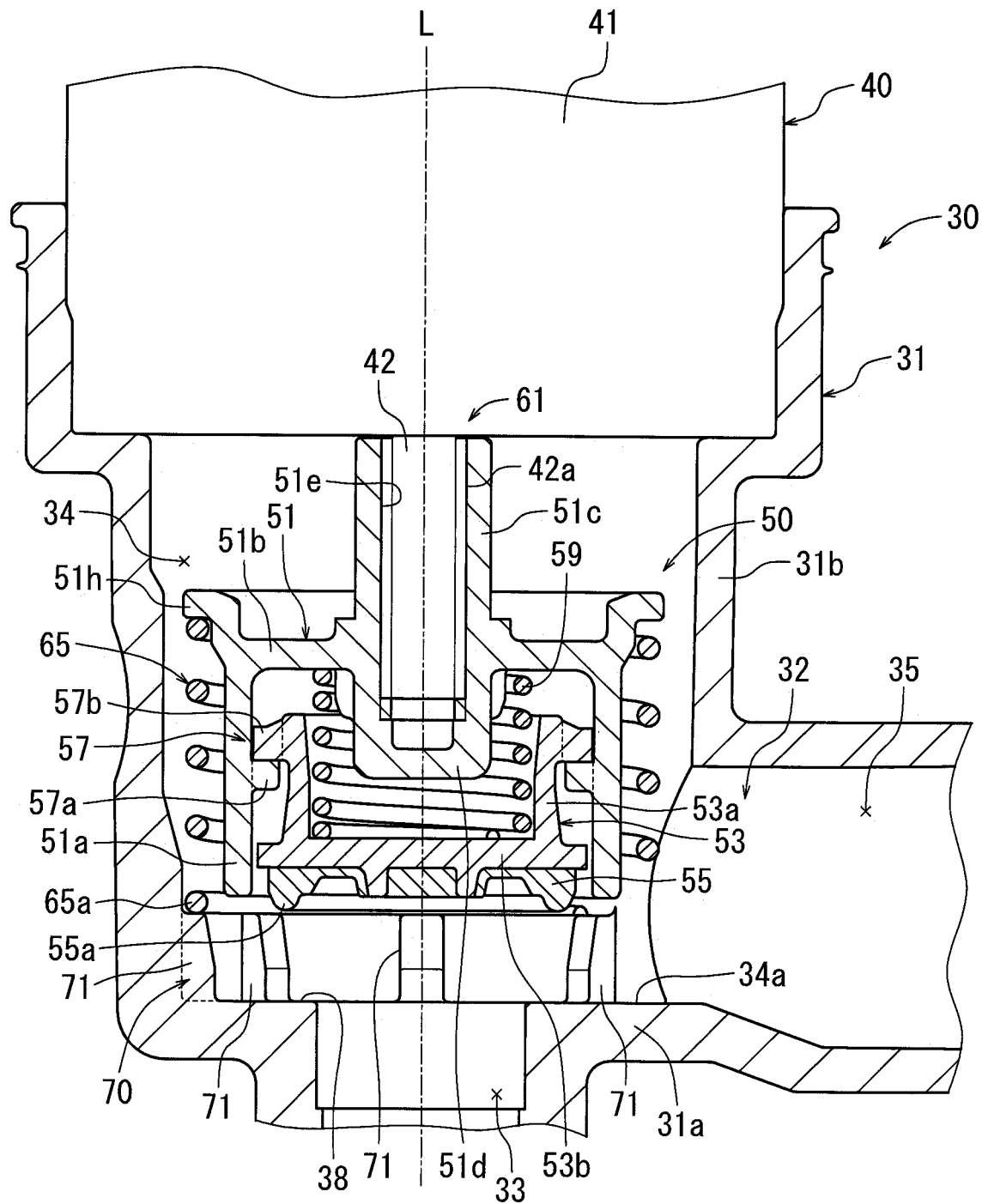
FIG. 3 is a cross-sectional side view of the flow control valve of FIG. 1 illustrating a valve-opened condition.

When the valve body 50 is closed (i.e., when the valve body 50 moves fully downward to close the valve seat 38), the sealing portion 55a of the sealing member 55 of the valve body 50 is brought into contact with and seated on the valve seat 38 (FIG. 2). As a result, the inlet port 33 is closed such that fluid is prevented from flowing between the inlet port 33 and the valve chamber 34. To the contrary, when the valve body 50 is opened (i.e., when the valve body 50 moves upward to open the valve seat 38), the sealing portion 55a of the sealing member 55 of the valve body 50 is spaced from the valve seat 38 (FIG. 3). As a result, the inlet port 33 is opened such that the fluid is allowed to flow between the inlet port 33 and the valve chamber 34. As a result, the fluid can flow from the inlet port 33 to the outlet port 35 through the valve chamber 34. Further, the valve spring 59 may expand and contract depending on the reciprocating motion of the valve body 50.

The flow control valve 30 further includes a backlash preventive spring 65. The backlash preventive spring 65 is concentrically positioned between the housing 31 and the valve retainer member 51. The backlash preventive spring 65 is configured to bias the valve body 50 in such a direction that backlash of the feed screw mechanism 61 may be prevented. In particular, the backlash preventive spring 65 is circumferentially and concentrically attached to the valve retainer member 51. Further, the backlash preventive spring 65 is sandwiched between the annular flange portion 51h formed on the valve retainer member 51 and a plurality of spring supporting devices 70 formed on the housing 31. The backlash preventive spring 65 is a coil spring and is configured to normally bias the valve retainer member 51 upward, thereby preventing backlash generated between the female thread portion 51e and the male thread portion 42a of the feed screw mechanism 61. Further, the backlash preventive spring 65 may expand and contract depending on the reciprocating motion of the valve body 50.

Figure 4:
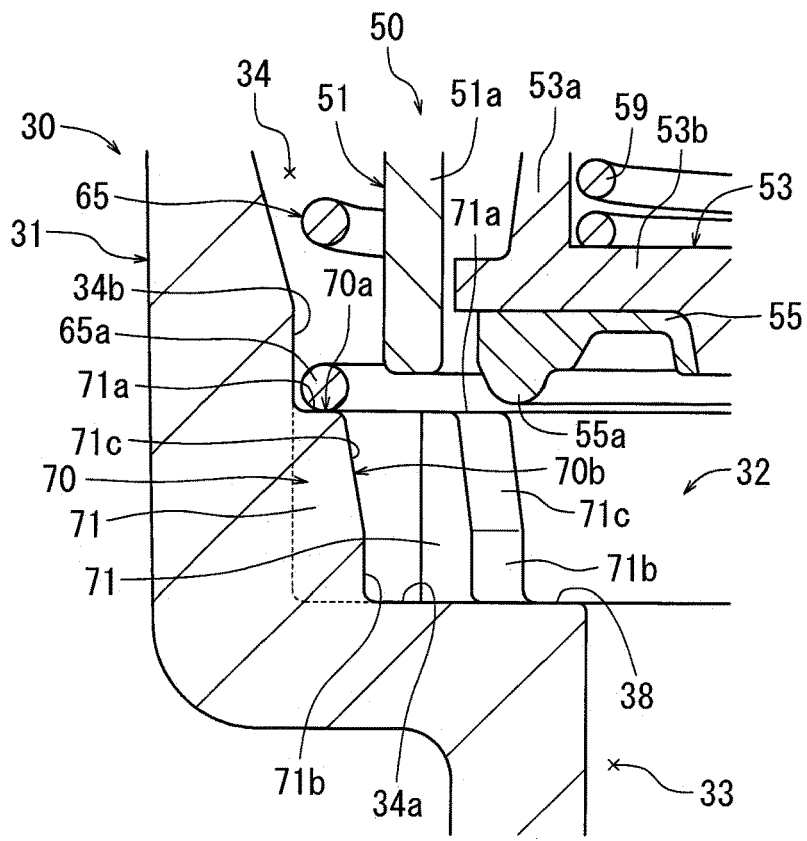
FIG. 4 is an enlarged partial view of the flow control valve of FIG. 3.
Figure 5:
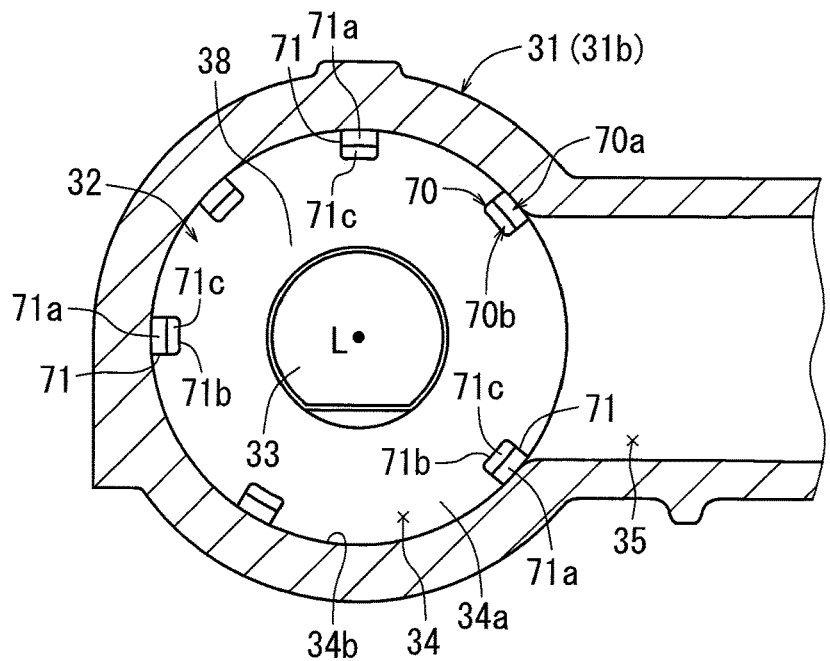
FIG. 5 is a cross-sectional plan view of the flow control valve of FIG. 1 with the valve body omitted.

As shown in FIG. 4, the spring supporting devices 70 are configured to receive a biasing force of the backlash preventive spring 65. The spring supporting devices 70 are formed as a plurality of (six in this embodiment) ribs 71, each of which has a vertically elongated rectangular columnar shape. As shown in FIG. 5, the ribs 71 are circumferentially spaced apart at intervals and integrally formed on an inner circumferential surface 34b of the circumferential wall 31b of the housing 31 (i.e., a circumferential surface of the valve chamber 34).

As shown in FIG. 4, the ribs 71 are positioned on an annular concave corner portion between the inner circumferential surface 34b of the circumferential wall 31b of the housing 31 and the upper surface 34a of the bottom wall 31a of the housing 31. In addition, the ribs 71 have flat upper surfaces 71a that are oriented perpendicular to the axis line L (FIGS. 2 and 3) of the valve chamber 34.

The upper surfaces 71a of the ribs 71 may also be referred to herein as spring seating surfaces 70a of the spring supporting devices 70. The spring seating surfaces 70a are configured to contact and receive a lower coil end 65a of the backlash preventive spring 65 when the valve body 50 is positioned in the valve chamber 34 of the housing 31. The spring seating surfaces 70a of the spring supporting devices 70 are spaced from the valve seat 38 (on which the valve body 50 is seated) in an opening direction of the valve body 50 (upward) in an axial direction of the valve chamber 34. Further, as shown in FIG. 4, in this embodiment, the valve body 50 is configured such that a lower end surface of the cylindrical wall portion 51a of the valve retainer member 51 is positioned on a level slightly higher than the spring seating surfaces 70a of the spring supporting devices 70 when the valve body 50 fully moves upward (i.e., when the valve body 50 is fully opened).

As shown in FIGS. 4 and 5, the ribs 71 constituting the spring supporting devices 70 have radially inwardly facing flat vertical surfaces 71b, and flat inclined surfaces 71c that are positioned between and continuous with the upper surfaces 71a and the vertical surfaces 71b. The inclined surfaces 71c of the ribs 71 may also be referred to herein as guide surfaces 70b of the spring supporting devices 70. The guide surfaces 70b are inclined outward in a radial direction of the valve chamber 34 with distance from the valve seat 38 in the axial direction of the valve chamber 34.

According to the embodiment, the spring supporting devices 70 formed on the housing 31 are configured such that the spring seating surfaces 70a are vertically spaced upward from the valve seat 38 in the opening direction of the valve body 50. Therefore, when the valve body 50 is opened, the lower coil end 65a of the backlash preventive spring 65 is held in a position spaced from the valve seat 38 so as to form a space between the lower coil end 65a of the backlash preventive spring 65 and the valve seat 38. Therefore, obstruction of a flow of fluid by the lower coil end 65a of the backlash preventive spring 65 and a spring portion adjacent to the coil end 65a can be reduced and/or avoided. This may lead to decrease of a fluid-flow resistance. Further, the backlash preventive spring 65 can be prevented from being circumferentially displaced. As a result, an area of a flow passage can be prevented from being changed so that the fluid-flow resistance can be prevented from being changed.

The spring supporting devices 70 are formed as the plurality of ribs 71 that are circumferentially spaced at intervals on the inner circumferential surface 34b of the circumferential wall 31b of the housing 31. Therefore, the flow of fluid cannot be obstructed by the spring supporting devices 70. Consequently, the area of the flow passage of the flow control valve 30 can be increased.

Further, the spring supporting devices 70 include the guide surfaces 70b. Therefore, when the valve body 50 is moved downward to be closed, the valve body 50 can be effectively prevented from being interfered with the spring supporting devices 70.

Naturally, various changes and modifications may be made to the embodiment of the flow control valve 30 disclosed herein. For example, the flow control valve 30 may be applied to various devices other than the evaporated fuel processing device 10. Further, the actuator is not limited to the stepping motor 40. For example, the actuator may be a DC motor that is controllable in rotational direction, rotational speed and amount of rotation. Further, the spring supporting devices 70 may be replaced with an annular projection that is continuously circumferentially formed on the inner circumferential surface 34*b* of the circumferential wall 31*b* of the housing 31. Further, in this embodiment, the valve body 50 is arranged such that the lower end surface of the cylindrical wall portion 51*a* of the valve retainer member 51 is positioned on a level higher than the spring seating surfaces 70*a* of the spring supporting devices 70 when the valve body 50 fully moves upward. However, the valve body 50 is arranged such that the lower end surface of the cylindrical wall portion 51*a* of the valve retainer member 51 is positioned on the same level as or a level lower than the spring seating surfaces 70*a* of the spring supporting devices 70. Further, the spring supporting devices 70 (the ribs 71) may be formed separately from the housing 31 and is integrated with the housing 31 by insert molding method.

A representative example of the present disclosure has been described in detail with reference to the attached drawings. This detailed description is merely intended to teach a person of skill in the art further details for practicing preferred aspects of the present disclosure and is not intended to limit the scope of the disclosure. Only the claims define the scope of the claimed disclosure. Therefore, combinations of features and steps disclosed in the foregoing detailed description may not be necessary to practice the disclosure in the broadest sense, and are instead taught merely to particularly describe detailed representative examples of the disclosure. Moreover, the various features taught in this specification may be combined in ways that are not specifically enumerated in order to obtain additional useful embodiments of the present disclosure.

The invention claimed is:

1. A flow control valve, comprising:
   a housing including a valve chamber, an inlet port extending from the valve chamber, an outlet port extending from the valve chamber, and a valve seat;
   a valve body disposed in the valve chamber and configured to move axially to close and open the valve seat;
   an actuator including a rotatable output shaft;
   a feed screw mechanism configured to convert a forward and a reverse rotational motion of the output rotational shaft to an axial reciprocation of the valve body;
   a backlash preventive spring comprising a coil spring positioned between the housing and the valve body, wherein the backlash preventive spring is configured to bias the valve body away from the valve seat to prevent backlash of the feed screw mechanism; and
   a spring supporting device fixed in position within the housing,
   wherein the spring supporting device includes a spring seating surface configured to contact and receive a coil end of the backlash preventive spring, and
   wherein the spring seating surface is spaced from the valve seat in an opening direction of the valve body in an axial direction of the valve chamber.

2. The flow control valve of claim 1, wherein the spring supporting device comprises a plurality of circumferentially spaced ribs positioned about the valve chamber, wherein the spring seating surface is defined on one or more of the plurality of ribs, and wherein the plurality of ribs are engaged with the coil end of the backlash preventive spring.

3. The flow control valve of claim 1, wherein the spring supporting device includes a guide surface that is inclined outward in a radial direction of the valve chamber at a distance from the valve seat in the axial direction of the valve chamber.

4. The flow control valve of claim 1, wherein the spring supporting device is positioned around the valve seat.

5. The flow control valve of claim 1, wherein the spring supporting device and the housing are formed as a single-piece monolithic body.

6. A flow control valve, comprising:
   a housing including a valve chamber, an inlet port extending from the valve chamber, an outlet port extending from the valve chamber, and a valve seat;
   a valve body disposed in the valve chamber and configured to move axially to close and open the valve seat;
   an actuator including a rotatable output shaft;
   a feed screw mechanism configured to convert a forward and a reverse rotational motion of the output rotational shaft to an axial reciprocation of the valve body;
   a backlash preventive spring comprising a coil spring positioned between the housing and the valve body, wherein the backlash preventive spring is configured to bias the valve body away from the valve seat to prevent backlash of the feed screw mechanism; and
   a spring supporting device monolithically formed the housing,
   wherein the spring supporting device includes a spring seating surface configured to directly contact and receive a coil end of the backlash preventive spring, and
   wherein the spring seating surface is spaced from the valve seat in an opening direction of the valve body in an axial direction of the valve chamber.

7. The flow control valve of claim 6, wherein the spring supporting device is fixed in position within the housing.

8. The flow control valve of claim 6, wherein the spring supporting device comprises a plurality of circumferentially spaced ribs positioned about the valve chamber, wherein the spring searing surface is defined on one or more of the plurality of ribs, and wherein the plurality of ribs are engaged with the coil end of the backlash preventing spring.

9. The flow control valve of claim 6, wherein the spring supporting device includes a guide surface that is inclined outward in a radial direction of the valve chamber at a distance from the valve seat in the axial direction of the valve chamber.

10. The flow control valve of claim 6, wherein the spring supporting device is positioned around the valve seat.

* * * * *